United States Patent
Choudury et al.

(10) Patent No.: US 10,780,642 B2
(45) Date of Patent: Sep. 22, 2020

(54) SYSTEM AND METHOD FOR COMPUTING SURFACES IN A MULTI-LAYER PART

(71) Applicant: Siemens Industry Software Inc., Plano, TX (US)

(72) Inventors: Gilbert Choudury, Waltham, MA (US); Gonzalo Feijoo, Wellesley, MA (US); Johan Arendt Grape, Boxborough, MA (US)

(73) Assignee: Siemens Industry Software Inc., Plano, TX (US)

( * ) Notice: Subject to any disclaimer, the term of this patent is extended or adjusted under 35 U.S.C. 154(b) by 0 days.

(21) Appl. No.: 16/074,008

(22) PCT Filed: Feb. 26, 2016

(86) PCT No.: PCT/US2016/019835
§ 371 (c)(1),
(2) Date: Jul. 30, 2018

(87) PCT Pub. No.: WO2017/146732
PCT Pub. Date: Aug. 31, 2017

(65) Prior Publication Data
US 2019/0039320 A1   Feb. 7, 2019

(51) Int. Cl.
*G05B 19/409* (2006.01)
*B29C 64/393* (2017.01)
(Continued)

(52) U.S. Cl.
CPC ............ *B29C 64/393* (2017.08); *B33Y 10/00* (2014.12); *B33Y 50/02* (2014.12); *G05B 19/409* (2013.01); *G05B 2219/49* (2013.01)

(58) Field of Classification Search
CPC ....... B29C 64/393; B33Y 10/00; B33Y 50/02; G06F 17/50; G06F 2217/16
See application file for complete search history.

(56) References Cited

U.S. PATENT DOCUMENTS

| 5,432,704 A | * | 7/1995 | Vouzelaud | ......... | G05B 19/4099 345/420 |
| 8,892,406 B2 | | 11/2014 | Grandine et al. | | |

(Continued)

FOREIGN PATENT DOCUMENTS

EP   2748735 A1   7/2014

OTHER PUBLICATIONS

Allaire et al.; "Stacking sequence and shape optimization of laminated composite plates via a level-set method." Jun. 2015, pp. 1-35.
(Continued)

*Primary Examiner* — Christopher E. Everett

(57) ABSTRACT

A system and method is provided that facilitates computing surfaces for layers of a multi-layer part. The system may include at least one processor configured to determine a plurality of surfaces for layers of at least one material that form a multi-layer part by repeatedly carrying out a level set method computation. The level set method computation may be carried out relative to an interface surface that propagates outwardly with each determined surface for each layer with respect to an initial surface, based on data that defines at least one thickness of the material in each layer and at least one drop-off rate of the material at a boundary of the material in each layer.

18 Claims, 7 Drawing Sheets

(51) Int. Cl.
    *B33Y 10/00*    (2015.01)
    *B33Y 50/02*    (2015.01)

(56) References Cited

U.S. PATENT DOCUMENTS

| | | | |
|---|---|---|---|
| 2013/0313756 A1* | 11/2013 | Chen | B29C 41/52 |
| | | | 264/401 |
| 2016/0176117 A1* | 6/2016 | Lee | G05B 19/4099 |
| | | | 700/98 |
| 2017/0203515 A1* | 7/2017 | Bennett | B29C 64/393 |
| 2018/0157243 A1* | 6/2018 | Michopoulos | G05B 19/4099 |

OTHER PUBLICATIONS

Kimmel et al.; "Shape offsets via level-sets"; Computer-Aided Design; Mar. 1993; vol. 25 Issue 3; pp. 154-162; Butterworth-Heinemann Ltd.

Irisarri et al.; "Optimal design of laminated composite structures with ply drops using stacking sequence tables"; Composite Structures; 2013; pp. 559-569; Elsevier Ltd.

Osher et al.; "Fronts propagating with curvature-dependent speed: Algorithms based on Hamilton-Jacobi formulations"; J. Comput. Phys.; 1988; 79; pp. 12-49.

Emiliano Cristiani et al: "A level set based method for fixing overhangs in 3D printing", Sep. 5, 2014 (Sep. 5, 2014), XP055316636, 14 pages.

James A Sethian et al: "An Overview of Level Set Methods for Etching, Deposition, and Lithography Development," IEEE Transactions on Semiconductor Manufacturing, IEEE Service Center, Piscataway, NJ, US, vol. 10, No. 1, Feb. 1, 1997 (Feb. 1, 1997), XP011055618, 18 pages.

Anonymous: "Level set method—Wikipedia," Jan. 30, 2016 (Jan. 30, 2016), pp. 1-4, XP055317023, 4 pages.

PCT Search Report dated Jan. 2, 2017, for PCT Application No. PCT/US2016/019835, 20 pages.

* cited by examiner

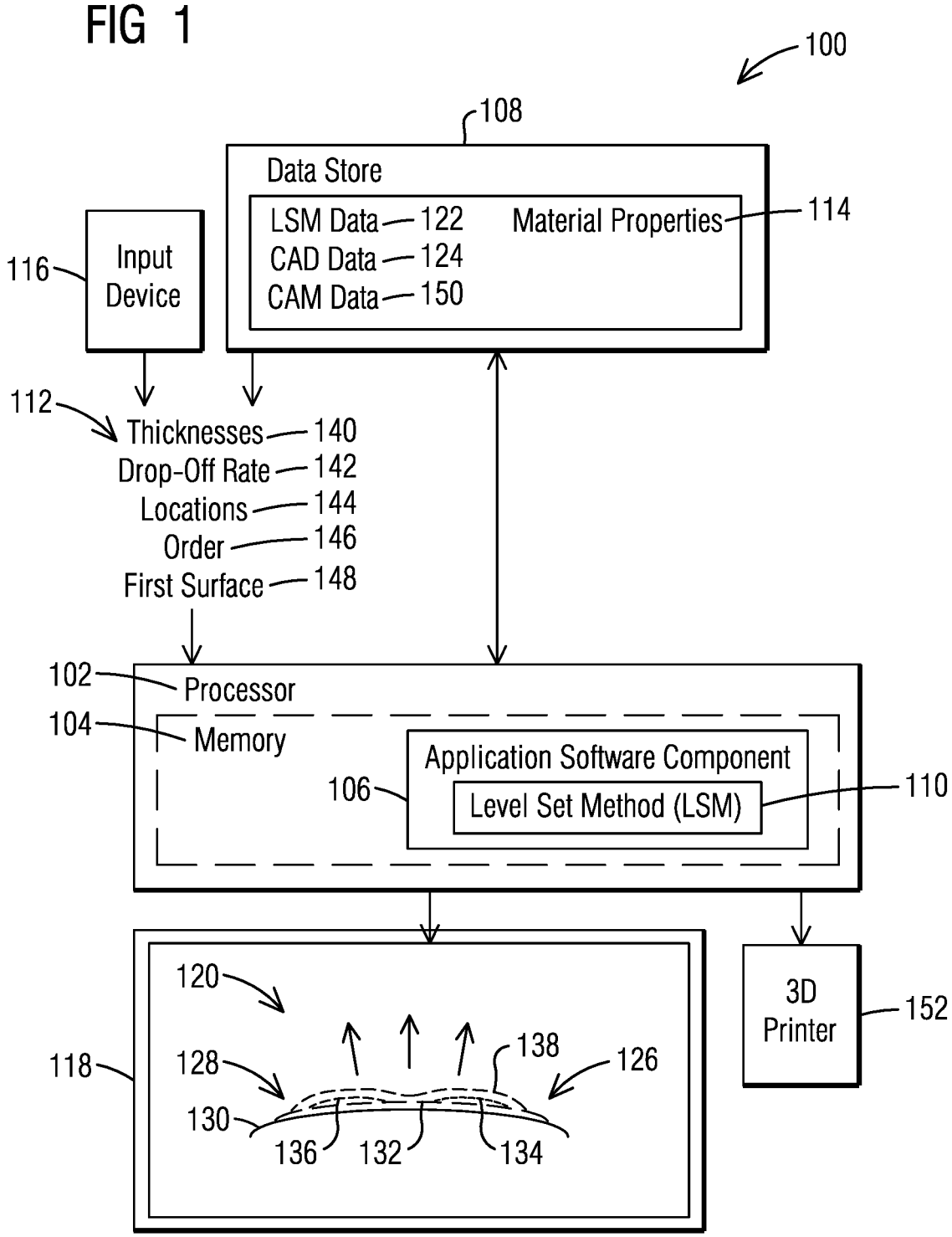

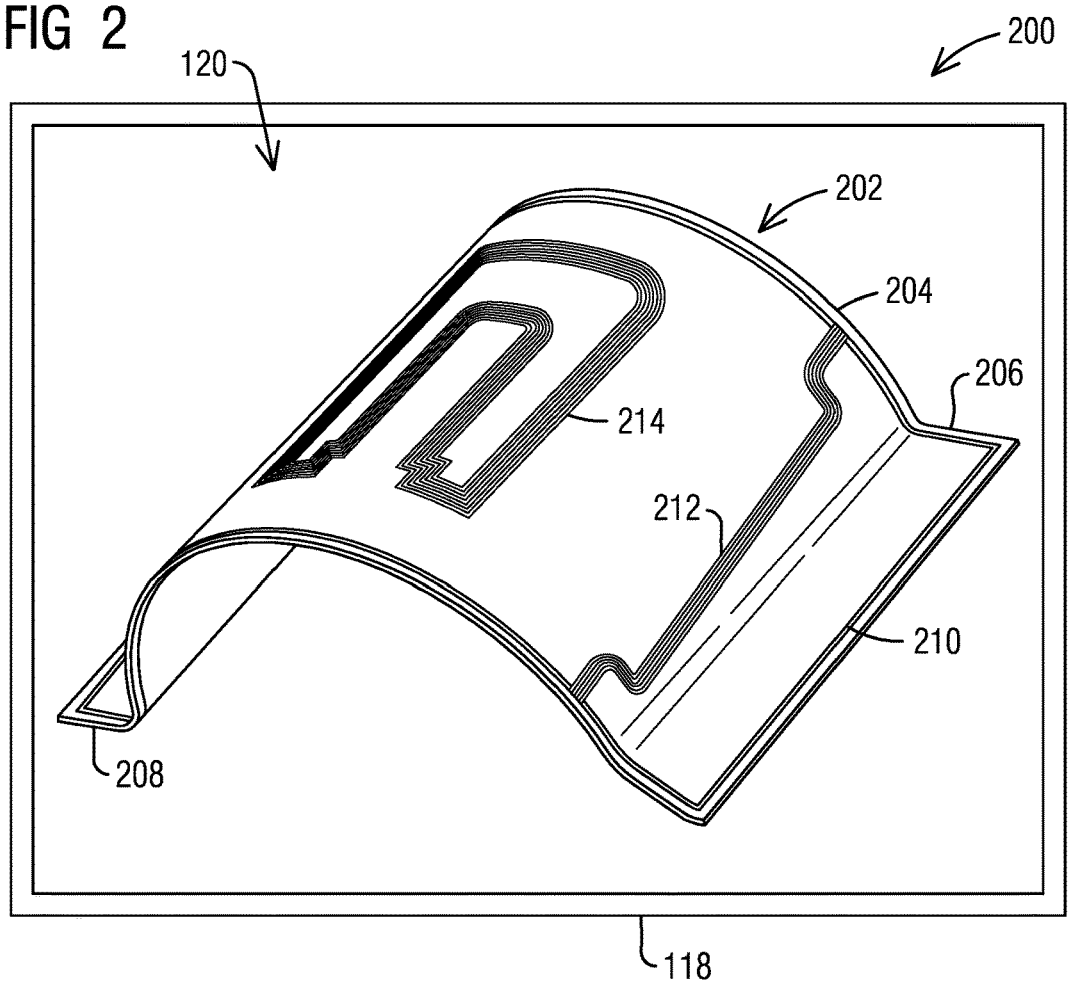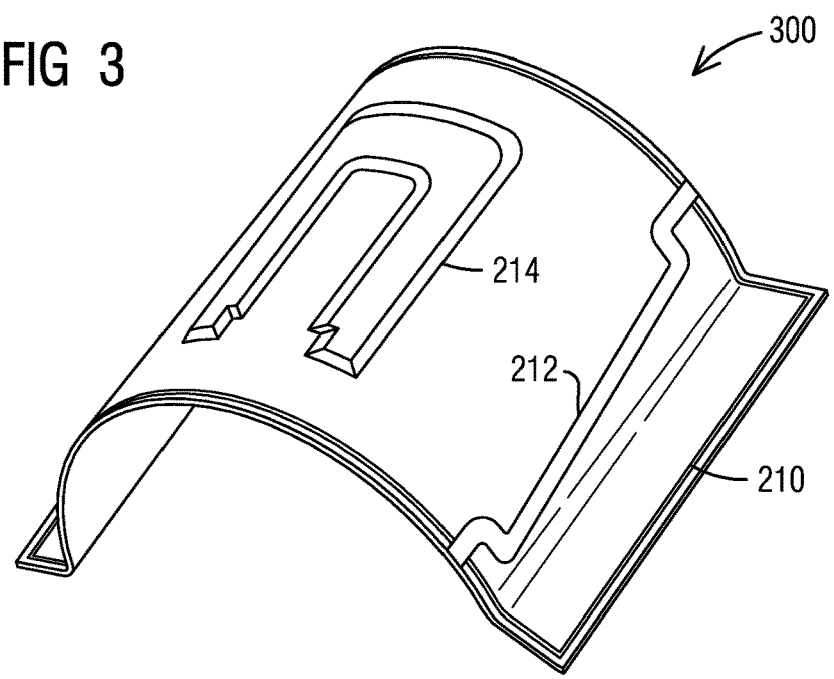

SYSTEM AND METHOD FOR COMPUTING SURFACES IN A MULTI-LAYER PART

TECHNICAL FIELD

The present disclosure is directed, in general, to computer-aided design (CAD), computer-aided manufacturing (CAM), computer-aided engineering (CAE), visualization, simulation, and manufacturing systems, product data management (PDM) systems, product lifecycle management (PLM) systems, and similar systems, that are used to create, use, and manage data for products and other items (collectively referred to herein as product systems).

BACKGROUND

Product systems may be used to create and manipulate models of parts comprised of laminates and/or deposited materials. Such product systems may benefit from improvements.

SUMMARY

Variously disclosed embodiments include data processing systems and methods that may be used to facilitate computing surfaces of layers in a multi-layer part (e.g., a laminate or 3D printed article) for use with modeling and producing the multi-layer part.

In one example, an apparatus for computing surfaces of layers in a part may comprise at least one processor configured to determine surfaces of layers of at least one material that form a part, by repeatedly carrying out a level set method computation relative to an interface surface that propagates outwardly with each determined surface and based on data that defines at least a thickness of the material in each layer and a drop-off rate of the material at a boundary of the material in each layer.

In another example, a method for computing surfaces for layers of a multi-layer part may include various acts carried out through operation of at least one processor. Such a method may include determining a plurality of surfaces for layers of at least one material that form a multi-layer part by repeatedly carrying out a level set method computation relative to an interface surface that propagates outwardly with each determined surface for each layer with respect to an initial surface, based on data that defines at least one thickness of the material in each layer and at least one drop-off rate of the material at a boundary of the material in each layer.

A further example may include non-transitory computer readable medium encoded with executable instructions (such as a software component on a storage device) that when executed, causes at least one processor to carry out this described method.

The foregoing has outlined rather broadly the technical features of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiments disclosed as a basis for modifying or designing other structures for carrying out the same purposes of the present disclosure. Those skilled in the art will also realize that such equivalent constructions do not depart from the spirit and scope of the disclosure in its broadest form.

Also, before undertaking the Detailed Description below, it should be understood that various definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

FIG. 1 illustrates a functional block diagram of an example system that facilitates computing surfaces of layers in a multi-layer part.

FIG. 2 illustrates an example GUI used to specify the location and ordering of plies for computing the surfaces of the plies when used to form a laminate.

FIGS. 3-5 illustrate the build-up of plies to form a laminate with layers of varying thickness computed using a level set method.

DETAILED DESCRIPTION

Figure 4:
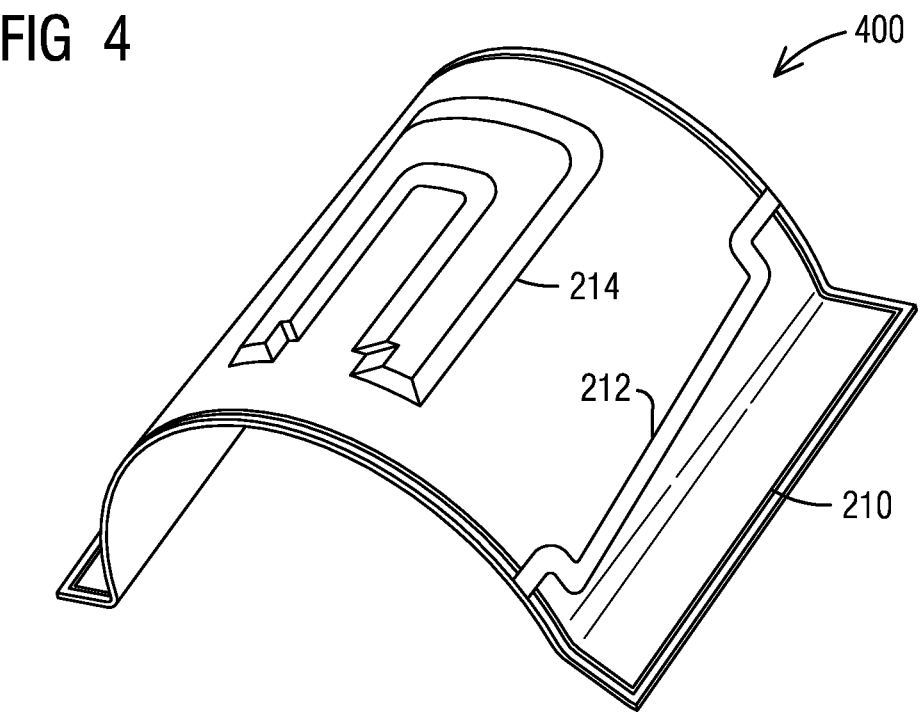

Various technologies that pertain to systems and methods that facilitate computing surfaces of layers in a multi-layer part will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

With reference to FIG. 1, an example data processing system 100 is illustrated that facilitates computing surfaces of layers in a multi-layer part. The processing system 100 may include at least one processor 102 that is configured to execute at least one application software component 106 from a memory 104 accessed by the processor. The application software component may be configured (i.e., programmed) to cause the processor to carry out various acts and functions described herein. For example, the described application software component 106 may include and/or correspond to one or more components of PLM software application that is configured to generate and store product data in a data store 108 such as a database.

Examples of PLM systems that may be adapted to compute surfaces of layers in a multi-layer part as described herein may include CAD and CAM software such as the NX suite of applications and Solid Edge software, which are produced by Siemens Product Lifecycle Management Software Inc., of Plano, Tex. However, it should be appreciated that the systems and methods described herein may be used in other product systems (e.g., a simulation system) and/or any other type of system that generates and stores product data in a database. Also, examples of databases that may be used as one or more data stores described herein include database server applications such as Oracle, Microsoft SQL Server, or any other type of data store that is operative to store data records.

As used herein, such a multi-layer component may correspond to a laminate comprised of a plurality of plies of the same or different materials. However, it should also be understood that a multi-layer component may correspond to a part that is additively built up via the depositing of material in successive layers from a deposition head of an additive machine (e.g., a 3D printer 152).

It should also be appreciated that laminated composites are usually created by depositing sheets of material (i.e., plies) on top of each other. Each layer of the laminated composite may comprise one or more plies. For example, a layer may comprise two or more plies in side-by-side relation that are placed on and/or under a larger ply of the material. Also, it should be appreciated that larger plies placed over a smaller ply may drape down over the smaller ply.

Creating a CAD model of the surfaces of the one or more plies in each layer, and of the final laminate component itself can be labor intensive. Such a model for example may be generated via specialized rule-based schemes that create simple region-based offset surfaces and then connect them through ramp geometry, or by offsetting the vertices of a faceted representation of the original surface.

These approaches treat the development of the surfaces of the layers as geometric operations, and thus may not accurately depict, quantitatively or qualitatively, the physical deformation of each subsequent ply as it conforms to the underlying plies. It should also be appreciated that any errors in representing the surfaces of the layers increases with each additional layer.

In order to more accurately compute these surfaces, an example embodiment of the described application software component 106 may carry out an approach that uses a level-set method (LSM) 110, which is an implicit scheme that considers the surfaces of layers to be the manifestation of an interface that is propagated from the starting layup/tool surface of the laminate. Via this approach, the processor 102 may compute and explicitly manifest any surface of a layer independent of the creation of intermediate geometric representation of underlying layers. This approach may more accurately account for different material properties of plies that impact the structure of the laminate, such as the bending stiffness of a ply that models the inherent resistance of the ply to conform to the underlying surface as plies drape over the underlying plies.

This approach may also use data 112 inputted through at least one input device 116 or acquired from a data base (such as from the data store 108) to incorporate material properties 114 of the materials and other parameters used to calculate the surfaces for each layer using LSM computations.

To enable the described application software component 106 to carry out these features, the described processing system 100 may include at least one input device 116 and at least one display device 118 (such as a display screen). The described processor 102 may be configured to generate a GUI 120 through the display device 118. Such a GUI may include GUI elements (such as buttons, links, search boxes, lists, text boxes, images, scroll bars) usable by a user to provide inputs through the input device 116 that cause the application software component 106 to carry out the level set method approach described herein to determine surfaces of layers for a multi-layer component. It should also be understood that where an input device is referred to herein, such an input device may correspond to one or more different input devices that are usable by a user to provide the data being inputted into the system.

The output of LSM computations described herein may include LSM data 122. Such LSM data may implicitly define the position of the surfaces. For example, as will be described herein in more detail, the outputted LSM data may correspond to a grid or mesh (e.g., sets of coordinates associated with points, together with their connectivities). Such grid points that are aligned with a surface of a layer (such as an outer surface of a ply in the layer), may be individually associated with data that associates the grid points to the particular ply. The LSM data may be stored in the data store 108 and may be used for different processes including modeling, simulation, and manufacturing.

For example, the application software component may be configured to determine an explicit geometric surface (e.g., faceted or fitted) for each ply and for the final component, from the implicitly defined surfaces in the LSM data. Such explicit geometric data may be stored as CAD data 124 in data store 108. In example embodiments, such determined LSM data 122 and/or CAD 124 data may be rendered as a two-dimensional (2-D) or three-dimensional (3-D) visual model of the part 126 that is displayed through the display device 118 by the at least one processor.

For examples carried out to model a part producible via a 3D printer, the LSM data and/or the CAD data may also be used by the processor 102 to generate CAM data 150 (e.g., GCode) stored in the data store 108 and/or outputted to an external system (e.g., the 3D printer 152). Such CAM data may provide tool paths to additively build up the part, via the addition of successive layers of material corresponding to the layers determined using the level-set method 110.

In general, the level set method corresponds to a mathematical technique to construct propagating curves or surfaces from an initial curve or surface. In example embodiments, the level set method is applied to the problem of determining the structure of a laminar solid and to model the buildup of layers of material that drape over each other.

As illustrated in FIG. 1, example embodiments of the application software component 106 uses the level set method 110 repeatedly to compute the surfaces of the layers 128 of material as the propagation of an interface that starts with an initial surface 130 (e.g., the layup tool, mold, build plate, or other engineering surface), and moves outwardly with the incremental addition of further layers 128 of material. The propagation is generally normal to the surface(s) upon which the layer of material is being applied, and thus the direction of propagation may vary at different points over the initial surface 130 as the coverage of the material layers is built up in each step.

The interface for each layer is computed through an iterative numerical procedure that solves the level set equation:

$$\frac{\partial \varphi}{\partial t} + v\|\nabla \varphi\| = 0$$

on a spatial grid that encloses the initial surface. Here $\varphi$ is the level-set function and the iteration starts by defining the values of $\varphi$ in the grid such that the initial surface is implicitly represented as the zero level set $\varphi=0$. The rate of propagation v of the level-set depends on the thickness of the layer, its coverage (or location) within the initial surface and a function that indicates how the layer "drops off" at the boundary. Both the level-set function $\varphi$ and the rate of propagation v are defined on the entire grid and thus are "extended" in the region away from the initial surface. One or more techniques may be used to compute these extensions. For example, this equation may be solved using any conservation-form numerical scheme (such as the first-order Godunov and Lax-Friedrichs schemes, or higher-order variants) through a number of steps that depends on the thickness of the layer and the spatial resolution of the grid. At the end of these steps, the values of $\varphi$ would have changed on the spatial grid. The interface corresponding to the first layer then is obtained by finding the new zero level-set $\varphi=0$ which is saved in the LSM data 122. The next layer is obtained by repeating this process (new iteration) with the new definition of the rate of propagation v from data corresponding to the next layer, and its extension on the grid. The procedure stops once all the layers have been computed.

Through this procedure any given layer can be generated from the LSM data as an explicit surface such as a faceted or fitted surface in CAD data.

In an example embodiment, the at least one processor 102 may be configured (via the application software component 106) to determine surfaces 132, 134, 136, 138 of layers 128 of at least one material that form the part 126, by repeatedly carrying out the level set method computation 110 relative to the interface surface 130 that propagates outwardly with each determined surface and based on data 112 that defines at least a thickness 140 of the material in each layer and a drop-off rate 142 of the material at a boundary of the material in each layer.

As illustrated in FIG. 1, in some examples, a layer may include two plies 134, 136. Thus the data 112 used by the level set method computation 110 may also include the desired location 144 of each material with respect to the initial surface 130 as well as the order 146 that each material is applied.

In example embodiments, such parameters may be provided via the input device 116. For example, the GUI 120 may include one or more windows, menus, input boxes, or other user interface objects that facilitate acquiring these parameters from a user that uses the application software component to compute the model of the part 126. Also, as discussed previously, some of the parameters may be acquired via the application software component 106 from the data store 108. For example, the GUI may enable the user to select a material type, location, and order for each respective ply used to build up the laminate. In response to this input, the application software component may query the data store 108 for default parameters associated with the thickness and drop-off region of each material to use with the level set method for the respective ply. Further, it should be appreciated that the GUI may be configured to enable a user to modify these default parameters via inputs through the input device 116.

In addition, it should be appreciated that the GUI 120 may be configured to enable the user to provide one or more first surface inputs 148 that select, draw and/or load, data that defines the initial surface 130. For example, the initial surface 130 may be represented by CAD data 124 (e.g., a CAD file of a mold) stored in the data store 108, that is loaded into memory 104 and displayed through the display device 118 via inputs through the input device 116. The GUI may then enable the user to provide the location of each ply relative to the initial surface as well as the order (i.e., the step) that the ply is applied.

FIG. 2 illustrates an example 200 in which the GUI 120 has been used to indicate the locations of a desired set of plies on an initial surface 202. In this example, the initial surface 202 corresponds to a roughly conical tool surface 204 with two flanges 206, 208. The application software component may enable a user to indicate the lateral location of several plies 210, 212, 214 on the initial surface 202. Such lateral locations correspond to the shape and relative locations of the plies with respect to the initial surface if applied directly on the initial surface (e.g., without thickness and with no other ply underneath). For example, the data for the lateral location of a ply does not include the position of the surface of the ply (normal direction) from the initial surface, as this position is what is intended to be determined via the level set method computation. In this example, the lateral locations of desired plies are visually represented as part of the initial surface in the form of hollow markings that depict the boundary of the plies. The width of the markings at the boundary may represent a drop-off region in which the thickness of the plies decreases towards the underlying interface surface.

It should be appreciated that several overlapping plies may be positioned in the same location, and thus may appear as one ply in this view. However, the GUI, for example, may enable each shape of ply shown in FIG. 2, to be assigned a number of plies that each shape represents as well as the order that each ply is the applied. In addition, the GUI may enable a user to provide the thickness of the material for each ply as well as data regarding the drop-off region. Also, the GUI may enable the separate plies for each shape, to be individually selected to provide individual parameters for each ply of this shape (such as thickness, order, and drop-off region data), which are used to calculate the position of their respective surfaces using a level set method.

For example, the "U" shaped ply 214 may correspond to several "U" shaped plies. Also the other smaller ply 212 may correspond to several smaller plies. In addition, the relatively larger ply 210 may also correspond to several larger plies having a size that cover the majority of the initial surface. Also, for example, each of these several plies may be provided with order numbers that correspond to a stack of "U" shaped plies and a stack of the other smaller plies 212, both being applied on top of a stack of the larger plies 210. In addition, a second stack of larger plies may be provided with order numbers that place them over top of the previously applied stacks in order to sandwich the "U" shaped stack of plies 214 and the other smaller stack of plies 212 between the two stacks of the larger plies 210.

Figure 5:
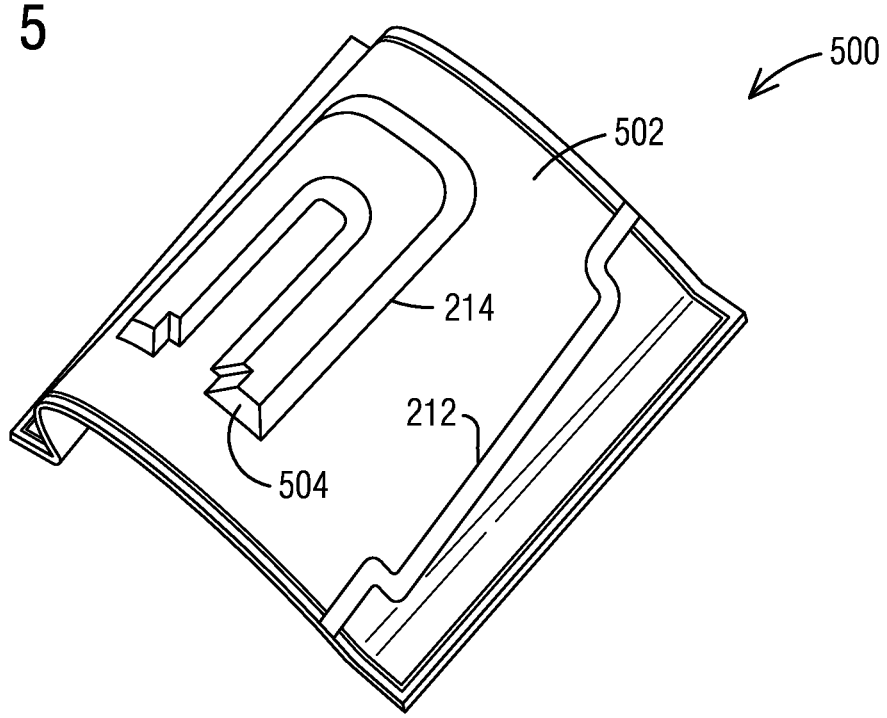

FIGS. 3, 4 and 5 illustrate visual representations of three snapshots 300, 400, 500 during the successive application of plies, in which the described level set method was used to calculate the positions of the surfaces shown in these drawings. In FIG. 3, a small number of layers of plies are illustrated, in which the majority of the plies are the relatively larger plies 210. In FIG. 4, additional plies are shown in which the impact of the smaller plies becomes more visible.

In FIG. 5, all of the plies have been added, and illustrates the effect of the build-up of the outer surface due to the addition of the smaller plies 212, 214 to create the shape of the final laminate 502. It should be noted in FIG. 5, that the previously described drop-off region forms a ramp-shaped feature 504 around the location of the smaller shaped plies 212, 214. This shape in the drop-off region results from the top stack of relatively larger plies curving along the edges and in the corner region between the smaller plies and the lower stack of relatively larger plies.

In order to determine the surfaces for each ply, the application software component may be configured to determine a 3D grid of points around the starting initial surface. Such a 3D grid may correspond to a Cartesian grid with a mechanism to handle sparse data so that the size of the grid is manageable. However, it should be appreciated that alternative embodiments may use different grid schemes, such as unstructured and/or hierarchical grids.

In an example embodiment, the application software component may be configured to initialize the level set computation in the grid from the CAD data corresponding to the user provided initial surface on which the layers of plies will be built up. In addition, the application software component may be configured to determine a maximum probable thickness of the composite based on the number of layers and the thicknesses of the plies included in each layer. Further, the application software component may be configured to determine an optimal grid that encloses the spatial region located between the initial surface and the determined maximum probable thickness of the laminate from the initial surface in the direction normal to the initial surface.

Figure 6:
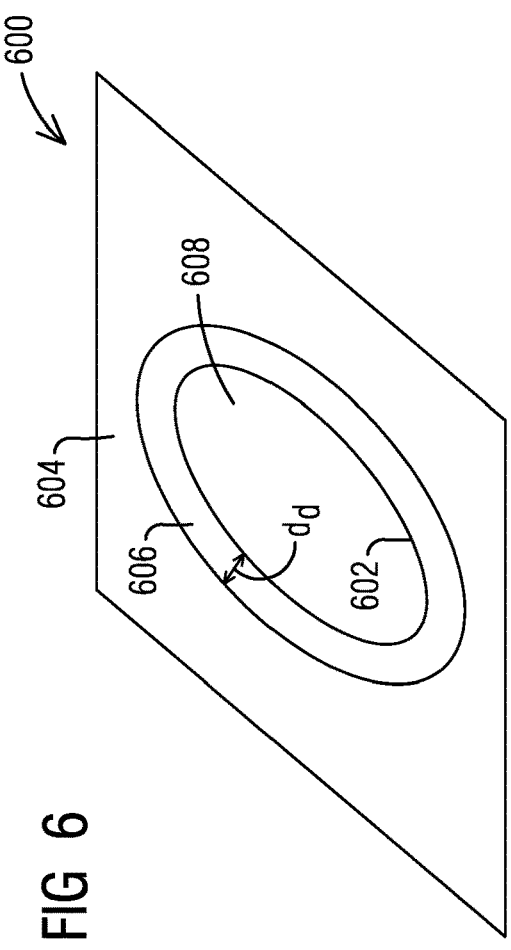
FIG. 6 illustrates a drop-off region used to model a ply of a laminate.

Based on the lateral location data and the iteration in the level set method that corresponds to which ply is currently being computed, the application software component may be configured to populate (i.e., associate) data for each grid point that specifies the extension of the velocity or rate of propagation v from each grid point's projection on the initial surface and the distance from the current zero level-set. Thus this data for each grid point may be based on the projection on the initial surface relative to the boundary and drop-off region of a ply. FIG. 6 depicts a schematic representation of a ply 600 with a boundary 602 on the initial surface 604. The depicted ring schematically represents the surrounding drop-off region 606 for the ply. For locations 608 interior to the boundary 602, the velocity is v=h where h is the user-specified ply thickness. For locations 604 exterior to the drop-off region 606, the velocity is zero. In the drop-off region 606 the velocity may be determined from an equation such as the following $$v = \left(1 - \frac{d}{d_d}\right)h$$

where d is the distance from the grid point's projection on the initial surface to the boundary 602 of the current ply that is being propagated, and where $d_d$ is the drop-off width of the drop-off region 606. However, it should be noted that in alternative embodiments, the velocity v may be defined via other equations that define alternative shapes in the drop-off region. Also in some embodiments, the projection from each grid point may be with respect to the latest propagated interface for the determination of the variable d.

The velocity thus defined corresponds to velocity values at the current zero level-set in the computation. The velocity on grid points outside the current zero-level set may be obtained using one or more procedures for "extending" the velocity function. In an example embodiment, the application software component may be configured to make use of 3D bounding-box schemes for query operations making the grid population process more efficient.

The result of each iteration in which the level set method is carried out is the location of an implicit surface defined by data associated with points in the grid, that has moved with the thickness of the ply wherever the ply coverage is and a fractional amount of the thickness in its associated drop-off region, and not elsewhere. In this example, such a drop-off region corresponds to regions at the boundary of the ply, where the surface gradually transitions from full offset (e.g., the specified thickness of the material) to a zero offset, where the ply does not result in an outward propagation of the interface.

In this example, the boundaries of the plies are defined relative to the initial surface. However, it should be understood that in further example embodiments, revised ply boundaries may be calculated as plies build up. For a relatively "thin" build-up (which could have hundreds of thin plies, for example) the definition of ply boundaries based on the initial surface is typically sufficient as the error between the two approaches is small. However, for larger build-ups (or build-ups that introduce relatively thick layers in between), draping simulations of the layers may be used to adjust the locations of some ply boundaries.

In example embodiments, based on the data associated with the grid points after each iteration of the level set method, the implicit surface can be captured/extracted for a ply at the end of each iteration. For example, the application software component may be configured to use a marching cubes algorithm to extract data to represent the CAD surface from the LSM data produced via this described process. However, it should be appreciated that alternative embodiments, may use other surface extraction algorithms to produce surface data including CAD surface data from the implicit surface data associated with the grid points described in this example.

Figure 7:
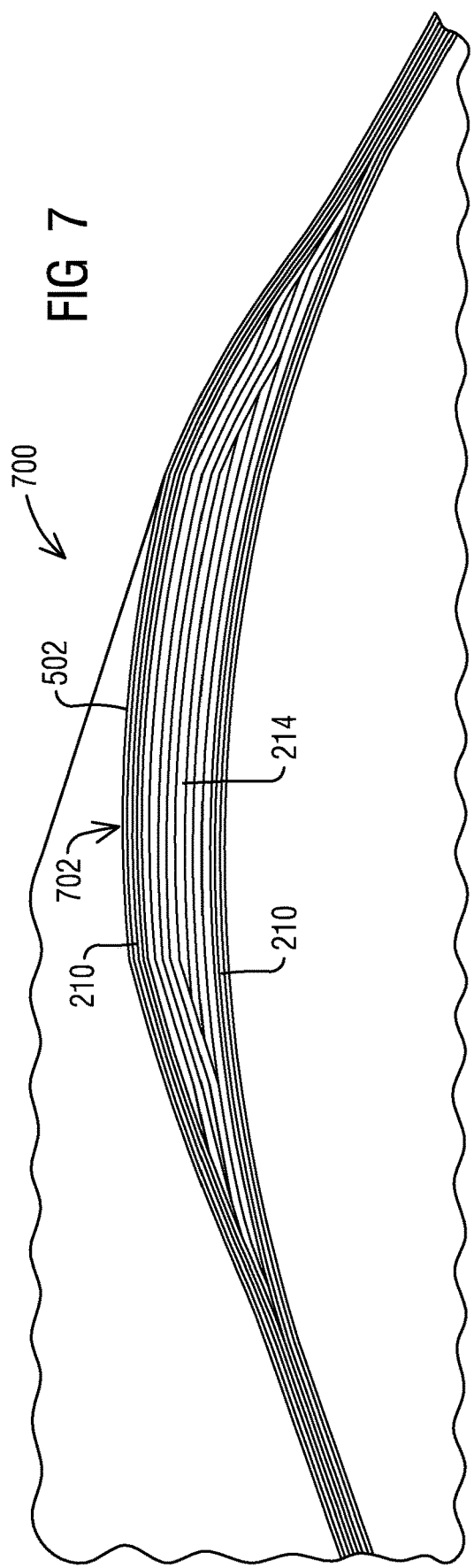
FIGS. 7-8 illustrate sectional views of the laminate in FIG. 5.

FIG. 7 illustrates a zoomed-in cut-out view 700 of a portion of the laminate 502 shown in FIG. 5. In this view, the various layers of plies 702 that form the laminate 502 are illustrated. In this example, the several stacks of the relatively larger plies 210 are illustrated above and below a stack of several of the "U" shaped plies 214. FIG. 7 also illustrates that the thickness of each "U" shaped plies 214 is greater than the thickness of each of the relatively larger plies 210.

Figure 8:
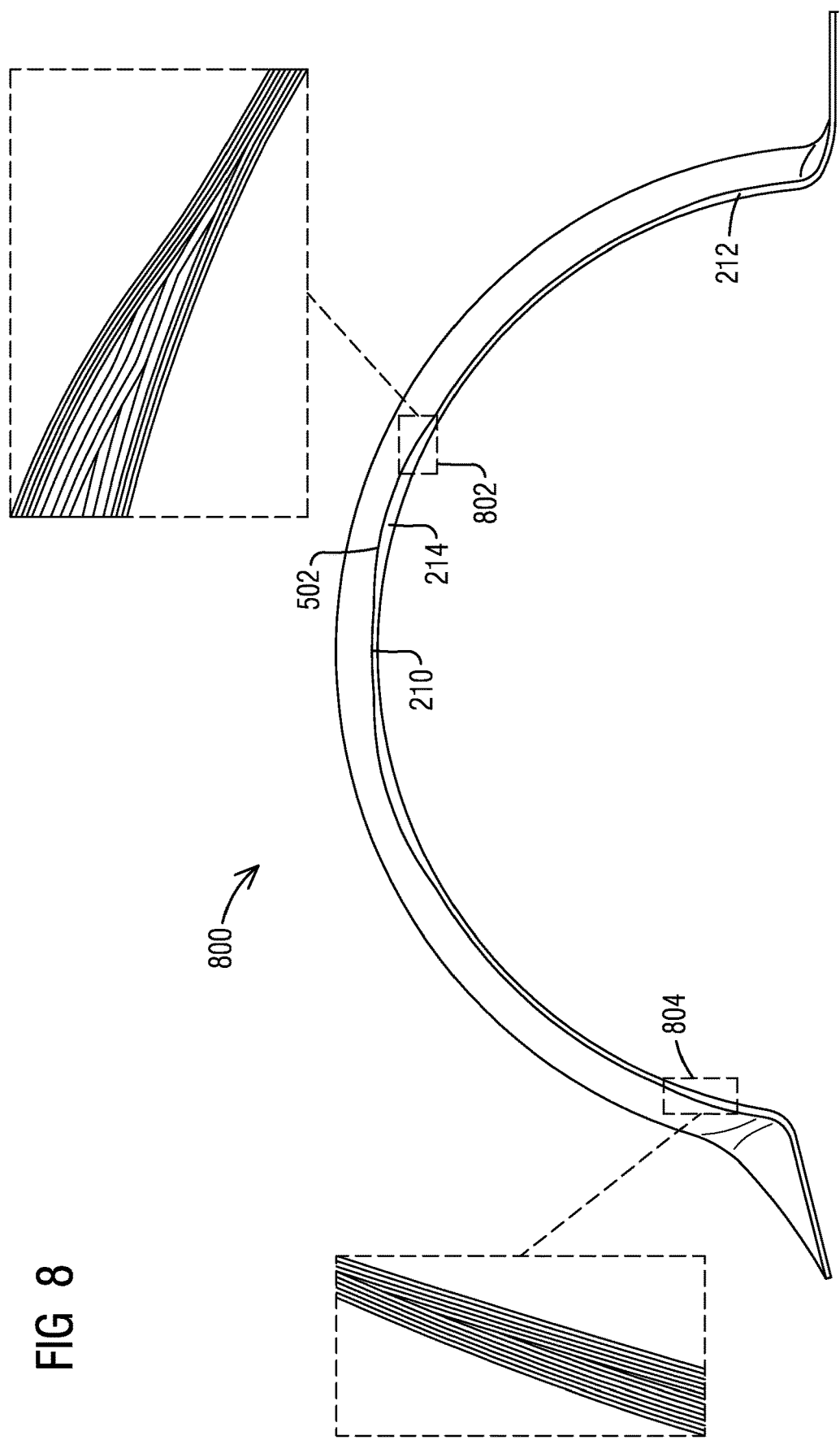

FIG. 8 illustrates another cross-sectional view 800 of the full width of the laminate 502. In this view, layers of the plies are illustrated that show areas 802, 804 with different thickness and different slopes in drop-off regions that bound the smaller plies.

Figure 9:
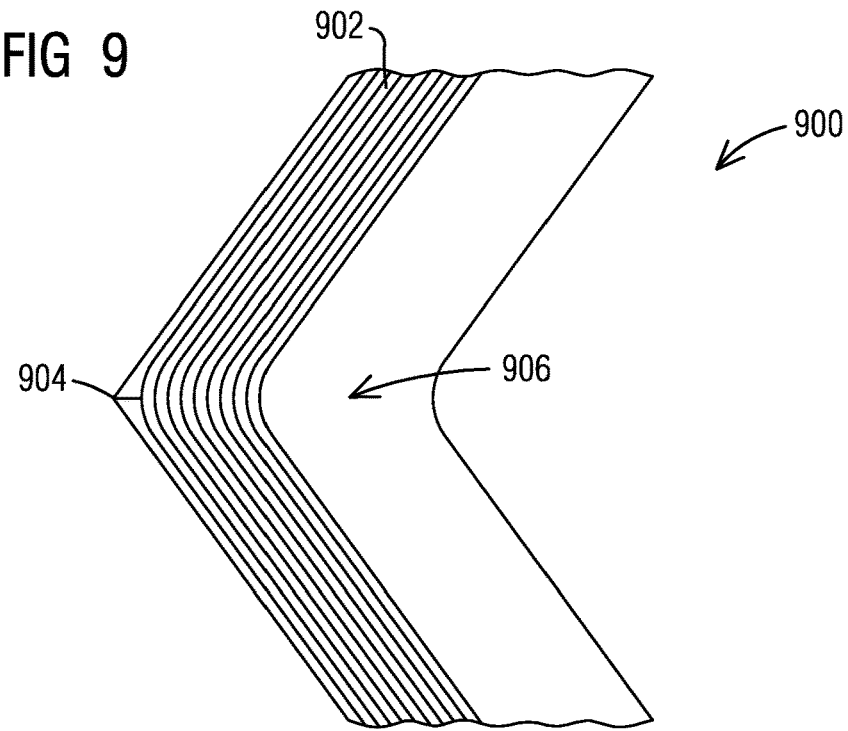
FIG. 9 illustrates a section view of the build-up of plies in a corner region of a laminate computed using a level set method.

An aspect of this approach is that it ensures that the propagating front (the interface) does not cross over itself. For example, as illustrated in FIG. 9, the described level set method is capable of determining the surfaces of layers 902 for a part 900, with the desired rounded behavior 906 at the corner 904.

As discussed previously, the implicit representation of the surfaces (i.e., the LSM data) provided by using this described level set method computation may be used to determine CAD data for the final surface of a laminate and/or individual surfaces of plies that make up the laminate. However, in some examples, the implicit representation of the surfaces (i.e., the LSM data) may be more complete and efficient to use than the explicit creation of each surface as CAD data. Thus for some purposes, the level set method may be used to deal with the progressive development of the surfaces of the composite layers without having to explicitly create each surface in CAD data.

For example, the application software component may be configured to enable a user to use the LSM data to determine only a subset of the surfaces, or only the final surface that is the top of the laminate for cases such as for matching tool design or a mockup. Also, for example, the application software component may be configured to use the LSM data to run draping simulations for manufacturability, and may be configured to extract curve-based representations for cross-sections, or do other geometric operations (such as Boolean operations).

The application software component may also be configured to use the LSM data to carry out calculations concerning volume, center of gravity, mass, and cost estimations (e.g., for total material usage). In addition, where high levels of detail are desired, the application software component may carry out manufacturing simulation effects on the LSM data. Such simulations for example may indicate the need for a layer to be thickened in certain areas due to bunching of the material as it conforms to the surface. The level set method may then be carried out again with different thickness parameters for one or more of the plies to produce a part that achieves more desirable simulations results.

As discussed previously, the described embodiments produce a composite with a variable thickness in various locations caused by material deformation, which may more accurately represent the variable thicknesses found in a physical composite produced via depositing, laying or draping the corresponding layers. For matched-mold tooling design, the variability in thickness effects can be substantial. Thus, an example embodiment of the application software component may provide the GUI with a user selected option that causes the software to automatically adjust the configuration of the initial surface (e.g., such as the curvatures of a mold surface) based on LSM data to produce a revised surface for the mold that will accommodate the thickness changes that are caused by the material deformation.

It should also be appreciated that the application software component may be configured to enable the level set method to be applied with different levels of precision. For example, the GUI may provide the user with the ability to specify the coarseness of the grid that the method is applied to in order to enable the resolution and accuracy of the resulting surfaces to be tuned. Different grid sizes furthermore enable the user to adjust the size of the problem in memory and the time to solution. Thus, a user may initially carry out a result generation for mockup using a coarser grid, and then subsequently carry out a more detailed generation for more complex applications such as tooling with a denser grid.

As discussed previously, example embodiments may use the level set method to determine the build-up of layers for an additive processes such as with a 3D printer. For example, the addition of layers by a deposition head of a 3D printer may produce the same type of rounded behavior 906 in a corner 904 as shown in FIG. 9. In addition, to increase the strength of different regions of a 3D printer generated part, different thicknesses of material may be applied by a deposition head in different regions such as illustrated in the example shown in FIG. 3, which produces drop-off regions that are more accurately determined via the described level set method.

Thus, the previously described example of the level set method computations described for plies of a laminate may be adapted to determine the location of layers of material deposited by a deposition head of a 3D printer to build a part. In this alternative embodiment, the size of the described 3D grid may be determined based on a user provided final design of a part provided via CAD data for example. Also, the previously described initial surface may correspond to a build plate of a 3D printer, which may be planar or have other shapes depending on the design of the part.

In addition, in this example a thickness (or several different thicknesses) for the material being deposited by a 3D printer, may be provided by a user via the GUI of the application software component. In addition, or alternatively, the user may provide an input that specifies the type and/or specific model of the 3D printer that is intended to be used to generate the part. Based on the specified 3D printer, the application software component may be operative to query information from the data store 108 regarding characteristics of the deposition head that may be used to determine the thickness (or range of thicknesses) for the deposited layers.

The described application software may then populate data for each grid point, which specifies which layers that the point's projection on the initial surface (in a direction normal to the initial surface) is "inside" of and the order in which these layers are deposited.

This described application software component may then be configured to propagate the outer surface (i.e., the previously described interface) one layer at a time in the order that the layers are applied using the level set method to calculate the position of each new interface. As discussed previously, each cycle of the level set method may include assigning a velocity normal to the interface that is driven by whether the locations at the grid points are inside or outside the layer that is currently being added. The application software component may then be configured to iterate until the interface has propagated the shape of the part.

The implicit surfaces of the layers represented in the LSM data provided by this example, may then be used by the application software component to generate GCode which specifies the path of the deposition head usable by the 3D printer to generate the part.

Figure 10:
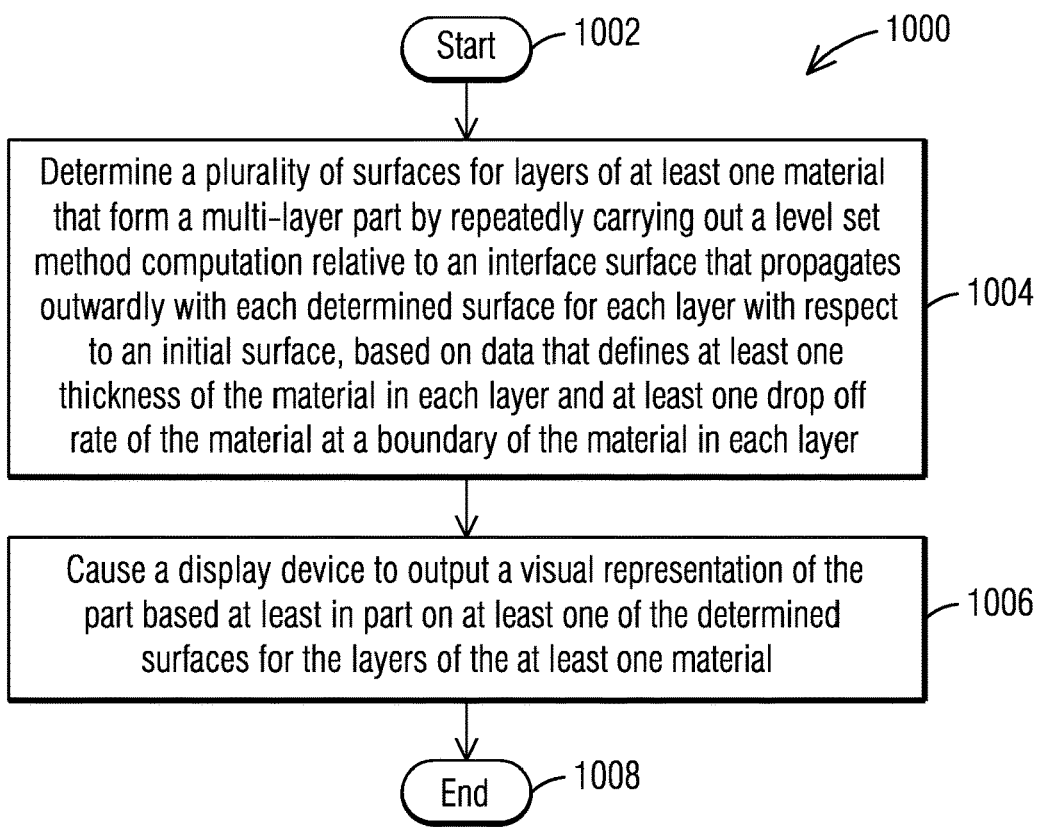
FIG. 10 illustrates a flow diagram of an example methodology that facilitates computing surfaces of layers in a multi-layer part.

With reference now to FIG. 10, various example methodologies are illustrated and described. While the methodologies are described as being a series of acts that are performed in a sequence, it is to be understood that the methodologies may not be limited by the order of the sequence. For instance, some acts may occur in a different order than what is described herein. In addition, an act may occur concurrently with another act. Furthermore, in some instances, not all acts may be required to implement a methodology described herein.

It is important to note that while the disclosure includes a description in the context of a fully functional system and/or a series of acts, those skilled in the art will appreciate that at least portions of the mechanism of the present disclosure and/or described acts are capable of being distributed in the form of computer-executable instructions contained within non-transitory machine-usable, computer-usable, or computer-readable medium in any of a variety of forms, and that the present disclosure applies equally regardless of the particular type of instruction or data bearing medium or storage medium utilized to actually carry out the distribution. Examples of non-transitory machine usable/readable or computer usable/readable mediums include: ROMs, EPROMs, magnetic tape, floppy disks, hard disk drives, SSDs, flash memory, CDs, DVDs, and Blu-ray disks. The computer-executable instructions may include a routine, a sub-routine, programs, applications, modules, libraries, a thread of execution, and/or the like. Still further, results of acts of the methodologies may be stored in a computer-readable medium, displayed on a display device, and/or the like.

Referring now to FIG. 10, a methodology 1000 that facilitates computing surfaces for layers of a multi-layer part is illustrated. The method may start at 1002 and the methodology may include several acts carried out through operation of at least one processor.

These acts may include an act 1004 of determining a plurality of surfaces for layers of at least one material that form a multi-layer part by repeatedly (i.e., iteratively) carrying out a level set method computation relative to an interface surface that propagates outwardly with each determined surface for each layer with respect to an initial surface, based on data that defines at least one thickness of the material in each layer and at least one drop-off rate of the material at a boundary of the material in each layer. In addition the methodology 1000 may include an act 1006 of causing a display device to output a visual representation of the part based at least in part on at least one of the determined surfaces for the layers of the at least one material. At 1008 the methodology may end.

It should be appreciated that the methodology 1000 may include other acts and features discussed previously with respect to the processing system 100. For example, when carrying out the methodology an initial level set method computation may be carried out relative to the interface layer corresponding to the initial surface defined by CAD data received by the at least one processor responsive to an input through an input device. Also, each subsequent level set method computation may be carried out relative to the interface layer including the most recently determined surface.

Also, as discussed previously, the material in each layer may correspond to at least one ply and the part may correspond to a laminate. In such cases, the data with which the level set method computation is carried out includes: the thickness of each ply, the lateral location of each ply relative to the initial surface, a drop-off rate for each ply, and/or an order that each ply is applied to build up the laminate.

In example embodiments, the methodology 1000 may also include an act of determining a maximum probable thickness of the laminate from the initial surface in a direction normal to the initial surface based at least in part on the thickness of each ply. Further, the methodology may include determining a three dimensional grid of points that encloses at least the spatial region located between the initial surface and a region determined from the maximum probable thickness. In addition, the methodology may include for each grid point specification of the rate of propagation of a ply based on the projection from each grid point on the initial surface relative to a boundary and a drop-off region for the ply. The boundary and the drop-off region for the ply may be based on the lateral location and the drop-off rate associated with the ply.

In this example, each subsequent iteration of the level set method computations may be carried out based on the data specified for the grid points and the interface determined from the immediate prior iteration of the level set method. Also in an example embodiment, the boundary of some of the plies may be adjusted to account for the orientation of the most recent interface surface on which such plies will be added.

As discussed previously, the level set computations may be carried out using a conservation-form numerical scheme such as Godunov's scheme, or other numeric processing scheme capable of solving level set method computations.

Also as discussed previously, the previously described CAD data may define the shape of the part that is desired to be generated via a 3D printer. Thus, the determined surfaces of layers may correspond to layers depositable by a 3D printer. In such an example embodiment, the methodology may further comprise generating instructions usable to control the 3D printer to generate the part based on the determined surfaces of layers.

As discussed previously, acts associated with these methodologies (other than any described manual acts) may be carried out by one or more processors. Such processor(s) may be included in one or more data processing systems, for example, that execute software components operative to cause these acts to be carried out by the one or more processors. In an example embodiment, such software components may comprise computer-executable instructions corresponding to a routine, a sub-routine, programs, applications, modules, libraries, a thread of execution, and/or the like. Further, it should be appreciated that software components may be written in and/or produced by software environments/languages/frameworks such as Java, JavaScript, Python, C, C#, C++ or any other software tool capable of producing components and graphical user interfaces configured to carry out the acts and features described herein.

Figure 11:
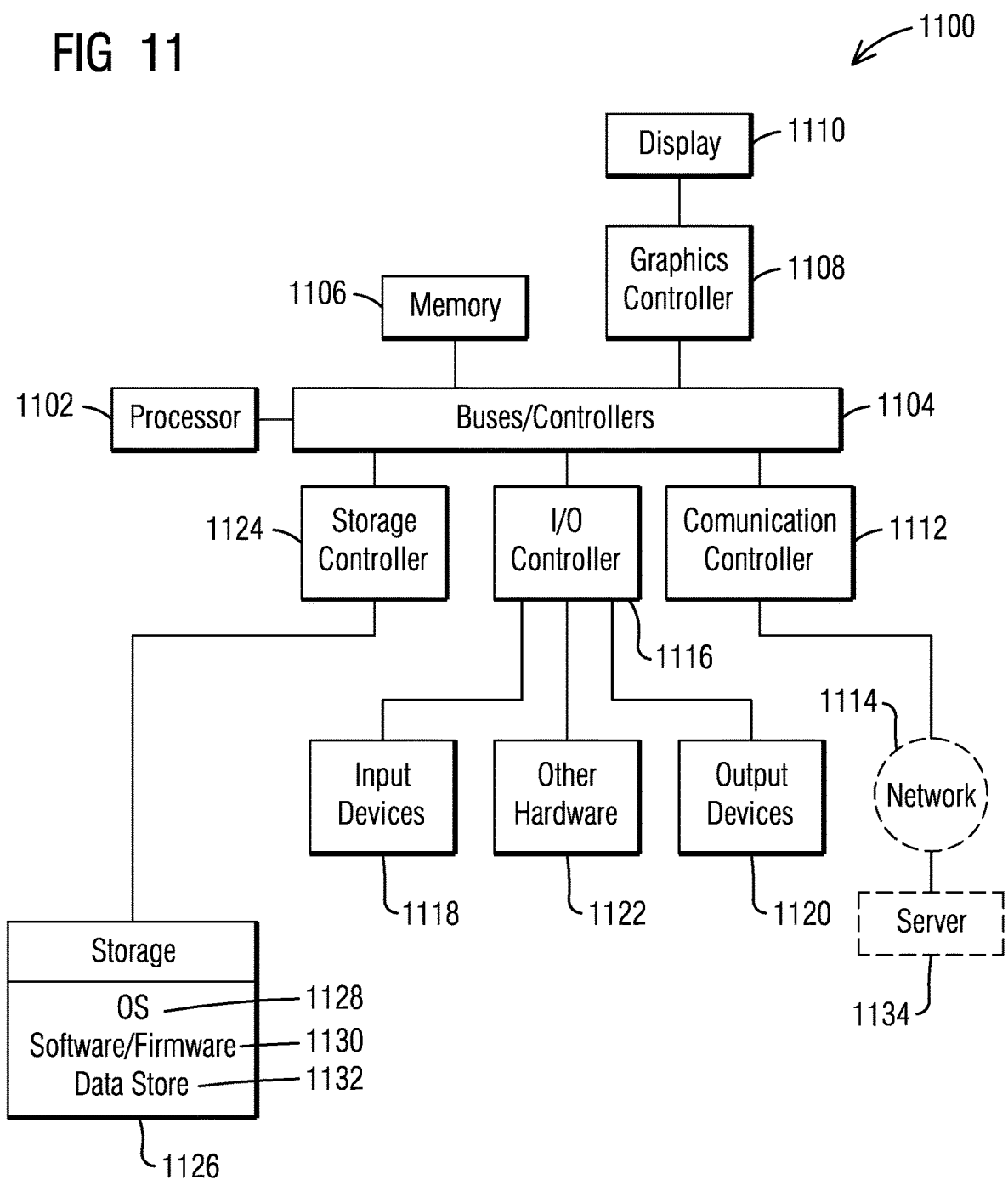
FIG. 11 illustrates a block diagram of a data processing system in which an embodiment may be implemented.

FIG. 11 illustrates a block diagram of a data processing system 1100 (also referred to as a computer system) in which an embodiment can be implemented, for example, as a portion of a product system, and/or other system operatively configured by software or otherwise to perform the processes as described herein. The data processing system depicted includes at least one processor 1102 (e.g., a CPU) that may be connected to one or more bridges/controllers/buses 1104 (e.g., a north bridge, a south bridge). One of the buses 1104, for example, may include one or more I/O buses such as a PCI Express bus. Also connected to various buses in the depicted example may include a main memory 1106 (RAM) and a graphics controller 1108. The graphics controller 1108 may be connected to one or more display devices 1110. It should also be noted that in some embodiments one or more controllers (e.g., graphics, south bridge) may be integrated with the CPU (on the same chip or die). Examples of CPU architectures include IA-32, x86-64, and ARM processor architectures.

Other peripherals connected to one or more buses may include communication controllers 1112 (Ethernet controllers, WiFi controllers, cellular controllers) operative to connect to a local area network (LAN), Wide Area Network (WAN), a cellular network, and/or other wired or wireless networks 1114 or communication equipment.

Further components connected to various busses may include one or more I/O controllers 1116 such as USB controllers, Bluetooth controllers, and/or dedicated audio controllers (connected to speakers and/or microphones). It should also be appreciated that various peripherals may be connected to the I/O controller(s) (via various ports and connections) including input devices 1118 (e.g., keyboard, mouse, pointer, touch screen, touch pad, drawing tablet, trackball, buttons, keypad, game controller, gamepad, camera, microphone, scanners, motion sensing devices that capture motion gestures), output devices 1120 (e.g., printers, speakers) or any other type of device that is operative to provide inputs to or receive outputs from the data processing system. Also, it should be appreciated that many devices referred to as input devices or output devices may both provide inputs and receive outputs of communications with the data processing system. For example, the processor 1102 may be integrated into a housing (such as a tablet) that includes a touch screen that serves as both an input and display device. Further, it should be appreciated that some input devices (such as a laptop) may include a plurality of different types of input devices (e.g., touch screen, touch pad, and keyboard). Also, it should be appreciated that other peripheral hardware 1122 connected to the I/O controllers 1116 may include any type of device, machine, or component that is configured to communicate with a data processing system.

Additional components connected to various busses may include one or more storage controllers 1124 (e.g., SATA). A storage controller may be connected to a storage device 1126 such as one or more storage drives and/or any associated removable media, which can be any suitable non-transitory machine usable or machine readable storage medium. Examples, include nonvolatile devices, volatile devices, read only devices, writable devices, ROMs, EPROMs, magnetic tape storage, floppy disk drives, hard disk drives, solid-state drives (SSDs), flash memory, optical disk drives (CDs, DVDs, Blu-ray), and other known optical, electrical, or magnetic storage devices drives and/or computer media. Also in some examples, a storage device such as an SSD may be connected directly to an I/O bus 1104 such as a PCI Express bus.

A data processing system in accordance with an embodiment of the present disclosure may include an operating system 1128, software/firmware 1130, and data stores 1132 (that may be stored on a storage device 1126 and/or the memory 1106). Such an operating system may employ a command line interface (CLI) shell and/or a graphical user interface (GUI) shell. The GUI shell permits multiple display windows to be presented in the graphical user interface simultaneously, with each display window providing an interface to a different application or to a different instance of the same application. A cursor or pointer in the graphical user interface may be manipulated by a user through a pointing device such as a mouse or touch screen. The position of the cursor/pointer may be changed and/or an event, such as clicking a mouse button or touching a touch screen, may be generated to actuate a desired response. Examples of operating systems that may be used in a data processing system may include Microsoft Windows, Linux, UNIX, iOS, and Android operating systems. Also, examples of data stores include data files, data tables, relational database (e.g., Oracle, Microsoft SQL Server), database servers, or any other structure and/or device that is capable of storing data, which is retrievable by a processor.

The communication controllers 1112 may be connected to the network 1114 (not a part of data processing system 1100), which can be any public or private data processing system network or combination of networks, as known to those of skill in the art, including the Internet. Data processing system 1100 can communicate over the network 1114 with one or more other data processing systems such as a server 1134 (also not part of the data processing system 1100). However, an alternative data processing system may correspond to a plurality of data processing systems implemented as part of a distributed system in which processors associated with several data processing systems may be in communication by way of one or more network connections and may collectively perform tasks described as being performed by a single data processing system. Thus, it is to be understood that when referring to a data processing system, such a system may be implemented across several data processing systems organized in a distributed system in communication with each other via a network.

Further, the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely.

In addition, it should be appreciated that data processing systems may be implemented as virtual machines in a virtual machine architecture or cloud environment. For example, the processor 1102 and associated components may correspond to a virtual machine executing in a virtual machine environment of one or more servers. Examples of virtual machine architectures include VMware ESCi, Microsoft Hyper-V, Xen, and KVM.

Those of ordinary skill in the art will appreciate that the hardware depicted for the data processing system may vary for particular implementations. For example, the data processing system 1100 in this example may correspond to a computer, workstation, server, PC, notebook computer, tablet, mobile phone, and/or any other type of apparatus/system that is operative to process data and carry out functionality and features described herein associated with the operation of a data processing system, computer, processor, and/or a controller discussed herein. The depicted example is provided for the purpose of explanation only and is not meant to imply architectural limitations with respect to the present disclosure.

Also, it should be noted that the processor described herein may be located in a server that is remote from the display and input devices described herein. In such an example, the described display device and input device may be included in a client device that communicates with the server (and/or a virtual machine executing on the server) through a wired or wireless network (which may include the Internet). In some embodiments, such a client device, for example, may execute a remote desktop application or may correspond to a portal device that carries out a remote desktop protocol with the server in order to send inputs from an input device to the server and receive visual information from the server to display through a display device. Examples of such remote desktop protocols include Teradici's PCoIP, Microsoft's RDP, and the RFB protocol. In such examples, the processor described herein may correspond to a virtual processor of a virtual machine executing in a physical processor of the server.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

Also, as used herein a processor corresponds to any electronic device that is configured via hardware circuits, software, and/or firmware to process data. For example, processors described herein may correspond to one or more (or a combination) of a microprocessor, CPU, FPGA, ASIC, or any other integrated circuit (IC) or other type of circuit that is capable of processing data in a data processing system, which may have the form of a controller board, computer, server, mobile phone, and/or any other type of electronic device.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 1100 may conform to any of the various current implementations and practices known in the art.

Also, it should be understood that the words or phrases used herein should be construed broadly, unless expressly limited in some examples. For example, the terms "include" and "comprise," as well as derivatives thereof, mean inclusion without limitation. The singular forms "a", "an" and "the" are intended to include the plural forms as well, unless the context clearly indicates otherwise. Further, the term "and/or" as used herein refers to and encompasses any and all possible combinations of one or more of the associated listed items. The term "or" is inclusive, meaning and/or, unless the context clearly indicates otherwise. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Also, although the terms "first", "second", "third" and so forth may be used herein to describe various elements, functions, or acts, these elements, functions, or acts should not be limited by these terms. Rather these numeral adjectives are used to distinguish different elements, functions or acts from each other. For example, a first element, function, or act could be termed a second element, function, or act, and, similarly, a second element, function, or act could be termed a first element, function, or act, without departing from the scope of the present disclosure.

In addition, phrases such as "processor is configured to" carry out one or more functions or processes, may mean the processor is operatively configured to or operably configured to carry out the functions or processes via software, firmware, and/or wired circuits. For example, a processor that is configured to carry out a function/process may correspond to a processor that is executing the software/firmware, which is programmed to cause the processor to carry out the function/process and/or may correspond to a processor that has the software/firmware in a memory or storage device that is available to be executed by the processor to carry out the function/process. It should also be noted that a processor that is "configured to" carry out one or more functions or processes, may also correspond to a processor circuit particularly fabricated or "wired" to carry out the functions or processes (e.g., an ASIC or FPGA design). Further the phrase "at least one" before an element (e.g., a processor) that is configured to carry out more than one function may correspond to one or more elements (e.g., processors) that each carry out the functions and may also correspond to two or more of the elements (e.g., processors) that respectively carry out different ones of the one or more different functions.

In addition, the term "adjacent to" may mean: that an element is relatively near to but not in contact with a further element; or that the element is in contact with the further portion, unless the context clearly indicates otherwise.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, act, or function is an essential element, which must be included in the claim scope: the scope of patented subject matter is defined only by the allowed claims. Moreover, none of these claims are intended to invoke a means plus function claim construction unless the exact words "means for" are followed by a participle.

What is claimed is:

1. An apparatus for computing surfaces for layers of a multi-layer part comprising:
    at least one processor configured to:
        determine a plurality of surfaces for layers of at least one material that form a multi-layer part by carrying out multiple iterations of a level set method computation relative to an interface surface that propagates outwardly with each surface for each layer determined for a given iteration of the level set method computation with respect to an initial surface, based on data that defines at least one thickness of the material in each layer and at least one drop-off rate of the material at a boundary of the material in each layer, including by:
        determining a maximum probable thickness of the multi-layer part from the initial surface in a direction normal to the initial surface based at least in part on the thickness of the material in each layer;
        determining a three dimensional grid of points that encloses at least a spatial region located between the initial surface and a region determined from the maximum probable thickness; and
        for a current iteration of the level set method computation to determine the surface for a given layer of the multi-layer part:
            for a given grid point for the given layer, specifying a rate of propagation of the given layer based on a projection from the given grid point on the initial surface relative to a boundary and a drop-off region for the given layer, wherein the boundary and the drop-off region for the given layer is based on a lateral location and the drop-off rate associated with the given layer,
            wherein a subsequent iteration of the level set method computation is carried out based on data specified for the given grid point and the surface for the given layer determined from the current iteration of the level set method computation.

2. The apparatus according to claim 1, wherein an initial level set method computation is carried out relative to a given interface surface corresponding to the initial surface defined by CAD data received by the at least one processor responsive to an input through an input device, wherein each subsequent iteration of the level set method computation is carried out relative to a layer that includes a most recently determined surface.

3. The apparatus according to claim 2, wherein the CAD data defines the shape of the part, wherein the determined surfaces of layers correspond to layers depositable by a 3D printer, wherein the at least one processor is configured to generate instructions usable to control the 3D printer to generate the part based on the determined surfaces of layers.

4. The apparatus according to claim 1, wherein the at least one processor is configured to cause a display device to output a visual representation of the part based at least in part on at least one of the determined surfaces for the layers of the at least one material.

5. The apparatus according to claim 1, wherein the material in each layer corresponds to at least one ply and the part corresponds to a laminate, wherein the data with which the level set method computation is carried out includes: a thickness of each ply, a lateral location of each ply relative to the initial surface, a drop-off rate for each ply, and/or an order that each ply is applied to build up the laminate.

6. The apparatus according to claim 1, wherein the level set method computations are carried out using a conservation-form numerical scheme including Godunov's scheme.

7. A method for computing surfaces for layers of a multi-layer part comprising:
through operation of at least one processor:
determining a plurality of surfaces for layers of at least one material that form a multi-layer part by carrying out multiple iterations of a level set method computation relative to an interface surface that propagates outwardly with each surface for each layer determined for a given iteration of the level set method computation with respect to an initial surface, based on data that defines at least one thickness of the material in each layer and at least one drop-off rate of the material at a boundary of the material in each layer, including by:
determining a maximum probable thickness of the multi-layer part from the initial surface in a direction normal to the initial surface based at least in part on the thickness of the material in each layer;
determining a three dimensional grid of points that encloses at least a spatial region located between the initial surface and a region determined from the maximum probable thickness; and
for a current iteration of the level set method computation to determine the surface for a given layer of the multi-layer part:
for a given grid point for the given layer, specifying a rate of propagation of the given layer based on a projection from the given grid point on the initial surface relative to a boundary and a drop-off region for the given layer, wherein the boundary and the drop-off region for the given layer is based on a lateral location and the drop-off rate associated with the given layer,
wherein a subsequent iteration of the level set method computation is carried out based on data specified for the given grid point and the surface for the given layer determined from the current iteration of the level set method computation.

8. The method according to claim 7, wherein an initial level set method computation is carried out relative to a given interface surface corresponding to the initial surface defined by CAD data received by the at least one processor responsive to an input through an input device, wherein each subsequent level set method computation is carried out relative to a layer that includes a most recently determined surface.

9. The method according to claim 8, wherein the material in each layer corresponds to at least one ply and the part corresponds to a laminate, wherein the data with which the level set method computation is carried out includes: a thickness of each ply, a lateral location of each ply relative to the initial surface, a drop-off rate for each ply, and/or an order that each ply is applied to build up the laminate.

10. The method according to claim 9, wherein the level set method computations are carried out using a conservation-form numerical scheme including Godunov's scheme.

11. The method according to claim 8, wherein the CAD data defines the shape of the part, wherein the determined surfaces of layers correspond to layers depositable by a 3D printer, further comprising through operation of at least one processor:
generating instructions usable to control the 3D printer to generate the part based on the determined surfaces of layers.

12. The method according to claim 7, further comprising:
causing a display device to output a visual representation of the part based at least in part on at least one of the determined surfaces for the layers of the at least one material.

13. A non-transitory computer readable medium encoded with executable instructions that when executed, cause at least one processor to:
determine a plurality of surfaces for layers of at least one material that form a multi-layer part by carrying out multiple iterations of a level set method computation relative to an interface surface that propagates outwardly with each surface for each layer determined for a given iteration of the level set method computation with respect to an initial surface, based on data that defines at least one thickness of the material in each layer and at least one drop-off rate of the material at a boundary of the material in each layer, including by:
determining a maximum probable thickness of the multi-layer part from the initial surface in a direction normal to the initial surface based at least in part on the thickness of the material in each layer;
determining a three dimensional grid of points that encloses at least a spatial region located between the initial surface and a region determined from the maximum probable thickness; and
for a current iteration of the level set method computation to determine the surface for a given layer of the multi-layer part:
for a given grid point for the given layer, specifying a rate of propagation of the given layer based on a projection from the given grid point on the initial surface relative to a boundary and a drop-off region for the given layer, wherein the boundary and the drop-off region for the given layer is based on a lateral location and the drop-off rate associated with the given layer,
wherein a subsequent iteration of the level set method computation is carried out based on data specified for the given grid point and the surface for the given layer determined from the current iteration of the level set method computation.

14. The non-transitory computer readable medium of claim 13, wherein an initial level set method computation is carried out relative to a given interface surface corresponding to the initial surface defined by CAD data received by the at least one processor responsive to an input through an input device, wherein each subsequent iteration of the level set method computation is carried out relative to a layer that includes a most recently determined surface.

15. The non-transitory computer readable medium of claim 13, wherein the executable instructions, when executed, further cause the at least one processor to cause a display device to output a visual representation of the part based at least in part on at least one of the determined surfaces for the layers of the at least one material.

16. The non-transitory computer readable medium of claim 13, wherein the material in each layer corresponds to at least one ply and the part corresponds to a laminate, wherein the data with which the level set method computation is carried out includes: a thickness of each ply, a lateral location of each ply relative to the initial surface, a drop-off rate for each ply, and/or an order that each ply is applied to build up the laminate.

17. The non-transitory computer readable medium of claim 13, wherein the level set method computations are carried out using a conservation-form numerical scheme including Godunov's scheme.

18. The non-transitory computer readable medium of claim 13, wherein the CAD data defines the shape of the part, wherein the determined surfaces of layers correspond to layers depositable by a 3D printer, wherein the executable instructions, when executed, further cause the at least one processor to generate instructions usable to control the 3D printer to generate the part based on the determined surfaces of layers.

\* \* \* \* \*